United States Patent
Fanning et al.

(10) Patent No.: US 9,256,401 B2
(45) Date of Patent: Feb. 9, 2016

(54) EDITOR VISUALIZATION OF SYMBOLIC RELATIONSHIPS

(75) Inventors: Michael C. Fanning, Redmond, WA (US); Randy S. Kimmerly, Woodinville, WA (US); Steven Edward Lucco, Seattle, WA (US); Andrew Sterland, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 527 days.

(21) Appl. No.: 13/149,693

(22) Filed: May 31, 2011

(65) Prior Publication Data

US 2012/0311533 A1   Dec. 6, 2012

(51) Int. Cl.
G06F 9/44   (2006.01)

(52) U.S. Cl.
CPC .................................. *G06F 8/33* (2013.01)

(58) Field of Classification Search
CPC ............ G06F 11/3604; G06F 11/3612; G06F 11/3624; G06F 11/3636; G06F 8/4436; G06F 8/51
USPC ......................................................... 717/111
See application file for complete search history.

(56) References Cited

U.S. PATENT DOCUMENTS

| | | |
|---|---|---|
| 5,485,615 A | 1/1996 | Wennmyr |
| 5,500,881 A | 3/1996 | Levin |
| 5,535,391 A | 7/1996 | Hejlsberg et al. |
| 5,579,518 A | 11/1996 | Yasumatsu |
| 5,687,377 A | 11/1997 | Pasquariello |
| 5,692,195 A | 11/1997 | Conner |
| 5,696,974 A | 12/1997 | Agrawal |
| 5,742,828 A | 4/1998 | Canady |
| 5,748,961 A | 5/1998 | Hanna |
| 5,748,963 A | 5/1998 | Orr |
| 5,842,220 A | 11/1998 | De Groot et al. |
| 5,845,118 A | 12/1998 | Gheth |
| 5,872,973 A | 2/1999 | Mitchell |
| 5,923,882 A | 7/1999 | Ho |
| 5,983,021 A | 11/1999 | Mitrovic |
| 6,018,628 A | 1/2000 | Stoutamire |
| 6,023,583 A | 2/2000 | Honda |
| 6,041,179 A | 3/2000 | Bacon |

(Continued)

FOREIGN PATENT DOCUMENTS

| | | |
|---|---|---|
| TW | 200539025 | 10/2006 |
| TW | 200634557 | 10/2006 |

OTHER PUBLICATIONS

WebStorm, "Web Coding Made Smarter", Dec. 28, 2010, p. 1-8.*

(Continued)

*Primary Examiner* — Duy Khuong Nguyen
(74) *Attorney, Agent, or Firm* — Kevin Sullivan; Aaron Hoff; Micky Minhas

(57) ABSTRACT

Enhancing dynamic code. A method includes obtaining one or more first data structures defining constructs in a body of dynamic language source code. From the one or more first data structures, identifier information is extracted for one or more of the defined constructs. Knowledge about the constructs is augmented. Using the identifier information and augmented knowledge, metadata about the body of the dynamic language source code is generated. The generated metadata is represented as a symbol table. The body of dynamic language source code is visually enhanced based on the symbol table structure.

18 Claims, 8 Drawing Sheets

(56) References Cited

U.S. PATENT DOCUMENTS

| | | |
|---|---|---|
| 6,041,180 A | 3/2000 | Perks et al. |
| 6,072,950 A | 6/2000 | Steensgaard |
| 6,100,885 A | 8/2000 | Donnelly et al. |
| 6,126,330 A | 10/2000 | Knight |
| 6,134,708 A | 10/2000 | Yui |
| 6,175,948 B1 | 1/2001 | Miller et al. |
| 6,237,135 B1 | 5/2001 | Timbol |
| 6,289,506 B1 | 9/2001 | Kwong |
| 6,292,938 B1 | 9/2001 | Sarkar et al. |
| 6,330,717 B1 | 12/2001 | Raverdy |
| 6,415,316 B1 | 7/2002 | Van Der Meer |
| 6,425,124 B1 | 7/2002 | Tominaga |
| 6,477,543 B1 | 11/2002 | Huang et al. |
| 6,560,774 B1 | 5/2003 | Gordon |
| 6,678,745 B1 | 1/2004 | Hodge |
| 6,785,880 B1 | 8/2004 | Beisiegel et al. |
| 6,804,682 B1 | 10/2004 | Kemper et al. |
| 6,807,548 B1 | 10/2004 | Kemper |
| 6,842,877 B2 | 1/2005 | Robarts |
| 6,895,578 B1 | 5/2005 | Kolawa |
| 6,915,301 B2 | 7/2005 | Hirsch |
| 6,928,425 B2 | 8/2005 | Grefenstette |
| 6,957,394 B1 | 10/2005 | Fernandez |
| 6,973,646 B1 | 12/2005 | Bordawekar |
| 6,981,249 B1 | 12/2005 | Knoblock et al. |
| 6,986,132 B1 | 1/2006 | Schwabe |
| 7,017,117 B2 | 3/2006 | Capps |
| 7,051,322 B2 | 5/2006 | Rioux |
| 7,120,897 B2 | 10/2006 | Ebbo |
| 7,127,707 B1 | 10/2006 | Mishra |
| 7,137,069 B2 | 11/2006 | Abbot |
| 7,152,229 B2 | 12/2006 | Chong |
| 7,197,702 B2 | 3/2007 | Niyogi |
| 7,246,361 B1 | 7/2007 | Scalora |
| 7,370,318 B1 | 5/2008 | Howe et al. |
| 7,389,498 B2 | 6/2008 | Meijer |
| 7,434,209 B2 | 10/2008 | Brown |
| 7,451,435 B2 | 11/2008 | Hunt et al. |
| 7,493,610 B1 | 2/2009 | Onodera |
| 7,530,056 B1 | 5/2009 | Yaari |
| 7,650,600 B2 | 1/2010 | King |
| 7,730,448 B2 | 6/2010 | Meijer |
| 7,818,729 B1 | 10/2010 | Plum et al. |
| 7,958,493 B2 | 6/2011 | Lindsey |
| 8,060,868 B2 | 11/2011 | Meijer et al. |
| 8,239,847 B2 | 8/2012 | Yu et al. |
| 8,321,836 B2 | 11/2012 | Meijer |
| 8,473,911 B1 | 6/2013 | Baxter |
| 8,555,250 B2 | 10/2013 | Fanning et al. |
| 2002/0016953 A1 | 2/2002 | Sollich |
| 2002/0095657 A1 | 7/2002 | Vaidyanathan |
| 2002/0095658 A1 | 7/2002 | Shulman |
| 2002/0129345 A1 | 9/2002 | Tilden et al. |
| 2002/0162091 A1 | 10/2002 | Crocker et al. |
| 2003/0023957 A1 | 1/2003 | Bau |
| 2003/0079199 A1 | 4/2003 | Barsness |
| 2003/0097648 A1 | 5/2003 | Allison |
| 2003/0131347 A1 | 7/2003 | Allison |
| 2004/0049763 A1 | 3/2004 | Bloch et al. |
| 2004/0098731 A1 | 5/2004 | Demsey |
| 2004/0117778 A1 | 6/2004 | Sehr et al. |
| 2005/0004973 A1 | 1/2005 | Snover |
| 2005/0081139 A1 | 4/2005 | Witwer |
| 2005/0086360 A1 | 4/2005 | Mamou |
| 2005/0091531 A1 | 4/2005 | Snover |
| 2005/0097611 A1 | 5/2005 | Kim |
| 2005/0114771 A1 | 5/2005 | Piehler |
| 2005/0198177 A1 | 9/2005 | Black |
| 2005/0278695 A1 | 12/2005 | Synovic |
| 2006/0015817 A1 | 1/2006 | Fioretti |
| 2006/0026559 A1 | 2/2006 | Gunturi |
| 2006/0031263 A1 | 2/2006 | Arrouye |
| 2006/0048097 A1 | 3/2006 | Doshi |
| 2006/0100975 A1 | 5/2006 | McMaster et al. |
| 2006/0173911 A1 | 8/2006 | Levin |
| 2006/0206391 A1 | 9/2006 | Delson |
| 2007/0038978 A1* | 2/2007 | Meijer et al. ................ 717/106 |
| 2007/0055978 A1 | 3/2007 | Meijer |
| 2007/0074188 A1* | 3/2007 | Huang et al. ................ 717/141 |
| 2007/0078823 A1 | 4/2007 | Ravindran et al. |
| 2007/0100967 A1 | 5/2007 | Smith et al. |
| 2007/0168940 A1 | 7/2007 | Lunawat |
| 2007/0169036 A1 | 7/2007 | Garner et al. |
| 2007/0220480 A1 | 9/2007 | Waldman et al. |
| 2007/0220486 A1 | 9/2007 | Lammel |
| 2007/0226708 A1 | 9/2007 | Varma |
| 2007/0234288 A1* | 10/2007 | Lindsey et al. ............. 717/117 |
| 2007/0234322 A1 | 10/2007 | Palacz |
| 2007/0240120 A1 | 10/2007 | Miller |
| 2007/0256060 A1 | 11/2007 | Ryu |
| 2008/0066063 A1 | 3/2008 | Pouliot et al. |
| 2008/0162885 A1 | 7/2008 | Wang et al. |
| 2008/0178151 A1 | 7/2008 | Chan et al. |
| 2008/0235660 A1 | 9/2008 | Chapman |
| 2008/0295083 A1 | 11/2008 | Meijer et al. |
| 2008/0320440 A1 | 12/2008 | Meijer et al. |
| 2008/0320453 A1 | 12/2008 | Meijer |
| 2009/0024986 A1 | 1/2009 | Meijer |
| 2009/0077543 A1 | 3/2009 | Siskind et al. |
| 2009/0313604 A1 | 12/2009 | Miceli |
| 2009/0319995 A1 | 12/2009 | Gawor |
| 2010/0083233 A1 | 4/2010 | Vanoverberghe |
| 2010/0106949 A1 | 4/2010 | Komatsu et al. |
| 2010/0218173 A1 | 8/2010 | Aharoni et al. |
| 2010/0257404 A1 | 10/2010 | Singh et al. |
| 2010/0299658 A1 | 11/2010 | Ng |
| 2011/0138361 A1* | 6/2011 | McEntee et al. ............ 717/125 |
| 2011/0138373 A1 | 6/2011 | Lane et al. |
| 2011/0154122 A1 | 6/2011 | Li et al. |
| 2011/0179347 A1* | 7/2011 | Proctor et al. .............. 715/234 |
| 2011/0202902 A1 | 8/2011 | Whelan |
| 2011/0271260 A1 | 11/2011 | Kwon et al. |
| 2011/0307869 A1 | 12/2011 | Cwalina |
| 2012/0011493 A1 | 1/2012 | Singh et al. |
| 2012/0192169 A1 | 7/2012 | Li et al. |
| 2012/0311533 A1 | 12/2012 | Fanning et al. |
| 2012/0311535 A1 | 12/2012 | Fanning et al. |
| 2012/0311536 A1 | 12/2012 | Fanning et al. |
| 2012/0311546 A1 | 12/2012 | Fanning et al. |
| 2013/0290987 A1 | 10/2013 | Meijer |

OTHER PUBLICATIONS

ReSharper, "Coding Assistance", Jan. 8, 2009, p. 1-5.*
Nokia Corporation, "QT Creator: Using the Editor," Retrieved Mar. 11, 2011, http://doc.qt.nokia.com/qtcreator-2.1-snapshot/creator-editor-using.html.
Silvaco, "Source Edit : Source Code Editor Window," Retrieved Mar. 11, 2011, http://www.silvaco.com/examples/silos/section1/example16/.
NetBeans, "Code Assistance in the NetBeans IDE Java Editor: A Reference Guide," Retrieved Mar. 11, 2011, http://netbeans.org/kb/docs/java/editor-codereference.html.
JetBrains, "Reshaper 5: Coding Assistance," Retrieved Mar. 11, 2011, http://www.jetbrains.com/resharper/features/coding_assistance.html.
Wolfram,"Mathematica Editor Advantages," Retrieved Mar. 11, 2011, http://reference.wolfram.com/workbench/index.jsp?topic=/com.wolfram.eclipse.help/html/tasks/why.html.
Wright, et al., "A Practical Soft Type System for Scheme", 1994, ACM, p. 250-262. (The year of publication is clearly prior to the filing of the Application. The month of publication is therefore irrelevant.).
Panizzi, et al., "On the Return Types of Virtual Functions", 1999, ACM, p. 37-42. (The year of publication is clearly prior to the filing of the Application. The month of publication is therefore irrelevant.).
Stan Schults. Language Enhancements in Visual Basic 2005. Oct. 2004. http://msdn2.microsoft.com/en-us/library/ms379584(vs.80).aspx. (14 pages).
Andy D. Pimentel. A Case for Visualization-integrated System-level Design Space Exploration (10 pages). Available at least as early as Dec. 31, 2005.

(56) References Cited

OTHER PUBLICATIONS eWay Ltd, http://www.eway.co.uk/interdevtricks. html#IntellisenseWorkarounds., available at least as early as Dec. 31, 2000. (3 pages).
Author Unknown, Theme Development, http://codex.wordpress.org/User:JPAUL/Theme_Development, Available at least as early as Mar. 30, 2007 (12 pages).
Ravikumar Raja, Themes in ASP.NET 2.0., Aug. 26, 2006 (14 pages).
Fritz Henglein, "Efficient Type Inference for Higher Order Binding-Time Analysis", May 1991, FPCA conference, pp. 1-23 <Henglein91. pdf>.
C. Enrique Ortiz, "Using the PIM API for Java ME, Part 2—Portability Considerations", http://developers.sun.com/mobility/apis/pim/pim2/, 3 pages, published Mar. 2007.
Pramod G. Joisha, et al., "Efficiently Adapting Java Binaries in Limited Memory Contexts", http:www.hpl.hp.com/personal/Pramod_Joisha/Publications/ijpp.pdf, 22pages, Retrieved Apr. 17, 2010.
Doug Tillman, "Write Adaptive, Dynamic Code Using Reflection", http://www.devx.com/Java/Article/27798/1954, 3 Pages, Retrieved Apr. 17, 2013.
Java.awt Class Desktop, http://java.sun.com/javase/7/docs/api/java/awt/Desktop.html#isSupported(java.awt.Desktop.Action), 6 pages, Retrieved Apr. 17, 2010.
Dynamic Object Members, http://msdn.microsoft.com/en-us/library/system.dynamic.dynamicobject_members.aspx, 3 pages, Retrieved Apr. 17, 2010.
U.S. Appl. No. 11/766,347, Apr. 3, 2012, Office Action.
U.S. Appl. No. 11/201,507, Sep. 3, 2008, Office Action.
U.S. Appl. No. 11/201,507, Mar. 23, 2009, Office Action.
U.S. Appl. No. 11/201,507, Feb. 22, 2010, Notice of Allowance.
U.S. Appl. No. 11/220,167, Feb. 6, 2009, Office Action.
U.S. Appl. No. 11/220,167, Aug. 7, 2009, Office Action.
U.S. Appl. No. 11/220,167, Jan. 20, 2010, Office Action.
U.S. Appl. No. 11/220,167, Jul. 7, 2010, Office Action.
U.S. Appl. No. 11/766,345, Mar. 1, 2012, Office Action.
U.S. Appl. No. 11/766,345, Aug. 2, 2012, Office Action.
U.S. Appl. No. 11/766,347, Sep. 19, 2012, Notice of Allowance.
U.S. Appl. No. 11/220,167, Oct. 22, 2012, Office Action.
U.S. Appl. No. 11/766,345, Nov. 26, 2012, Office Action.
U.S. Appl. No. 11/220,167, Mar. 1, 2013, Notice of Allowance.
U.S. Appl. No. 12/816,249, Oct. 1, 2012, Office Action.
U.S. Appl. No. 12/816,249, Mar. 20, 2013, Office Action.
U.S. Appl. No. 10/972,871, Feb. 27, 2007, Office Action.
U.S. Appl. No. 10/972,871, Sep. 12, 2007, Office Action.
U.S. Appl. No. 10/972,871, Dec. 14, 2007, Office Action.
U.S. Appl. No. 10/972,871, Jul. 15, 2008, Office Action.
U.S. Appl. No. 10/972,871, Dec. 26, 2008, Office Action.
U.S. Appl. No. 10/972,871, May 13, 2009, Office Action.
U.S. Appl. No. 11/766,345, May 30, 2013, Office Action.
U.S. Appl. No. 12/816,249, Aug. 1, 2013, Notice of Allowance.
Notice of Allowance dated Jan. 15, 2014 U.S. Appl. No. 13/926,074.
Aho et al., "Code Generation using Tree Matching and Dynamic Programming", Journal ACM Transaction, 1989 (The month of Publication is irrelevant since the year of Publication is clearly prior to the filing of the Application), retrieved from <http://delivery.acm.org/10.1145/80000/75700/p491-aho.pdf?ip=151.207.250.71&id=75700&acc=PUBLIC&key=986B26D8D17D60C8AAC6AC1B60173C4E&CFID=388800748&CFToken=45549369&_acm_=1387004132_25f394285293c937e3f3bad1e7a7dfc>, 26 pages.
Notice of Allowance dated Dec. 26, 2013 U.S. Appl. No. 13/149,676.
Dolby, J., "Using Static Analysis for IDE's for Dynamic Languages," Available at least as early as Oct. 14, 2005, http://www.eclipse.org/org/langsymp/JulianDolby_paper.pdf.
Biggar, P., et al., "Static analysis of dynamic scripting languages," Available at least as early as Mar. 15, 2011, http://www.paulbiggar.com/research/wip-optimizer.pdf.
Furr, M., et al., "Profile-Guided Static Typing for Dynamic Scripting Languages", Published Apr. 2009.

Misek, J., et al., "Mapping of Dynamic Language Constructs into Static Abstract Syntax Trees," 9th IEEE/ACIS International Conference on Computer and Information Science, Aug. 18-20, 2010.
Abadi, M., et al., "Dynamic Typing in a Statically Typed Language", Published Apr. 1991, http://www.hpl.hp.com/techreports/Compaq-DEC/SRC-RR-47.pdf.
Misek., J., et al., "Syntactic and Semantic Prediction in Dynamic Languages," Published 2009, http://ulita.ms.mff.cuni.cz/~zavoral/pub/09-SERA-Intellisense.pdf (The month of Publication is irrelevant since the year of Publication is clearly prior to the filing of the Application).
Aycock, "Aggressive Type Inference," Published 2009, http://www.python.org/workshops/2000-01/proceedings/papers/aycock/aycock.html (The month of Publication is irrelevant since the year of Publication is clearly prior to the filing of the Application).
Anderson, C., et al., "Towards Type Inference for JavaScript", Published 2009, http://pubs.doc.ic.ac.uk/typeinferenceforjavascript-ecoop/typeinferenceforjavascript-ecoop.pdf (The month of Publication is irrelevant since the year of Publication is clearly prior to the filing of the Application).
Foster, "Data Flow Analysis 1—15-411 Compiler Design", Alex Aiken, Oct. 5, 2004, pp. 44.
Paul Carson, "Source code models and their use in assessing software quality", University of Strathclyde, Glasgow, UK, Nov. 2007, pp. 10.
Alejandro Russo, "Dynamic vs. Static Flow-Sensitive Security Analysis", Jul. 2010, Chalmers University of Technology, pp. 187-199, <http://ieeexplore.ieee.org/starnp/stamp.jsp?tp=arnumber=5552646&tag=1>.
Richard Fairley, "Tutorial: Static Analysis and Dynamic Testing of Computer Software", Apr. 1978, Colorado State University, pp. 14-23, <http://ieeexplore.ieee.org/stamp/stamp.jsp?tp=&arnumber=1646907>.
Davide Balzarotti, "Saner: Composing Static and Dynamic Analysis to Validate Sanitization in Web Applications", May 2008, University of California, pp. 387-401, <http://ieeexplore.ieee.org/stamp/stamp.jsp?tp=&arnumber=4531166>.
Cox, A., et al., "Lexical Source-Code Transformation," Published 2004, Faculty of Computer Science, Dalhousie University, Halifax, Nova Scotia, Canada.
Louden, K., "Compiler Construction: Principles and Practice," Available at least as early as Mar. 11, 2011, http://www.cs.aue.auc.dk/~akbar/2006/compilerconst06.html.
Stackoverflow, "A Language for Semantic Analysis?" Available at least as early as Mar. 11, 2011, http://stackoverflow.com/questions/1417120/a-language-for-semantic-analysis.
Crockford, D., "JSMin—The JavaScript Minifier," Available at least as early as Mar. 11, 2011, http://www.crockford.com/javascript.jsmin.html.
Chu-Carroll and Potluck, "Compiling and Optimizing Dynamic Parallel Programs," Jun. 24, 2005, pp. 3-4, 7, and 11-12.
Google search results "closure conversion dynamic programming language", Available at least as early as Sep. 24, 2012.
Ip.com search results "break a block of source code into multiple smaller blocks of code", Available at least as early as Sep. 24, 2012.
Munchnick, Stevens S., "Advanced compiler design and implementation", Morgan Kaufmann Publishers, Aug. 19, 1997, pp. 169 and 371-372.
U.S. Appl. No. 13/149,651, Feb. 22, 2013, Office Action.
U.S. Appl. No. 13/149,651, Jun. 5, 2013, Notice of Allowance.
U.S. Appl. No. 13/149,665, Jan. 30, 2013, Office Action.
U.S. Appl. No. 13/149,665, May 23, 2013, Office Action.
U.S. Appl. No. 13/149,665, Nov. 21, 2013, Notice of Allowance.
U.S. Appl. No. 13/149,676, Oct. 2, 2012, Office Action.
U.S. Appl. No. 13/149,676, Mar. 23, 2013, Office Action.
U.S. Appl. No. 13/149,676, Jul. 19, 2013, Office Action.

* cited by examiner

```
var myGlobal = "test";

function parentFunction(input, name) {
    var declaredWithinParent;

for (index = 0; < input; ++index) {
        (function nestedFunction(argument) {
            var declaredWithinChild;

alert(argument);
            alert(declaredWithinParent);
            alert(myGlobal);

})(index);
    }
};
```

Error:
'name' overwrites a symbol of the same name in global scope

602 — var myGlobal = "test";
604 — function parentFunction(input, name) {
606 — var declaredWithinParent;
608 — for (index = 0; < input; ++index) {
610 — alert(argument); alert(declaredWithinParent); alert(myGlobal);

*Figure 6*

```
var myGlobal = "test";

function parentFunction(input, name) {
    var declaredWithinParent;

for (index = 0; < input; ++index) {
        (function nestedFunction( argument )) {
            var declaredWithinChild;
            alert(argument);
            alert(declaredWithinParent);
            alert( myGlobal );
        })(index);
    }
};
```

EDITOR VISUALIZATION OF SYMBOLIC RELATIONSHIPS

BACKGROUND

Background and Relevant Art

Computers and computing systems have affected nearly every aspect of modern living. Computers are generally involved in work, recreation, healthcare, transportation, entertainment, household management, etc.

Computers are typically controlled using computer software. The computer software includes executable instructions that can be executed by one or more processors to cause the computer to perform various functions. Computer software may be created using source code created in a programming language. Code may be categorized in several different ways. One distinctive method of categorizing computer code is categorizing it as either static or dynamic.

Static code can typically be easily analyzed before runtime as the code typically is defined before runtime and does not change at runtime, the type system is well defined before runtime and does not change at runtime, and types within the type system are defined before runtime and do not change at runtime. Compilers, before runtime, can perform static analysis on static code and provide information to developers regarding characteristics of the static code or potential problems with a body of code.

Alternatively, some computer code may be classified as dynamic. In dynamic code, new code may be added at runtime. Additionally, static code type systems are not well defined before runtime. Further still, types within a static code type system can change at runtime. Thus, static analysis, before runtime, of dynamic code is hard due to the changing nature of the dynamic code at runtime.

Generating and editing dynamic language source code can be confusing for a developer because of unusual rules implemented by some dynamic languages. For example, JavaScript has interesting and sometimes confusing scoping rules. In particular, a variable declaration within a brace in JavaScript may nonetheless be a global variable. Similarly, a variable may be declared at the end of a body of JavaScript code, but the declaration is sufficient for use with code declared earlier in the body of code. This can be visually confusing for a developer. Further, an out of scope reference to a variable in JavaScript will result in either a new variable being created or a global variable being used. These issues can result in code correctness problems and code editing difficulties.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein illustrates a method of enhancing dynamic code. The method includes obtaining one or more first data structures defining constructs in a body of dynamic language source code. From the one or more first data structures, identifier information is extracted for one or more of the defined constructs. Knowledge about the constructs is augmented. Using the identifier information and augmented knowledge, metadata about the body of the dynamic language source code is generated. The generated metadata is represented as a symbol table. The body of dynamic language source code is visually enhanced based on the symbol table structure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 6 illustrates a number of editor visualization implemented by some embodiments;

DETAILED DESCRIPTION

Figure 1:
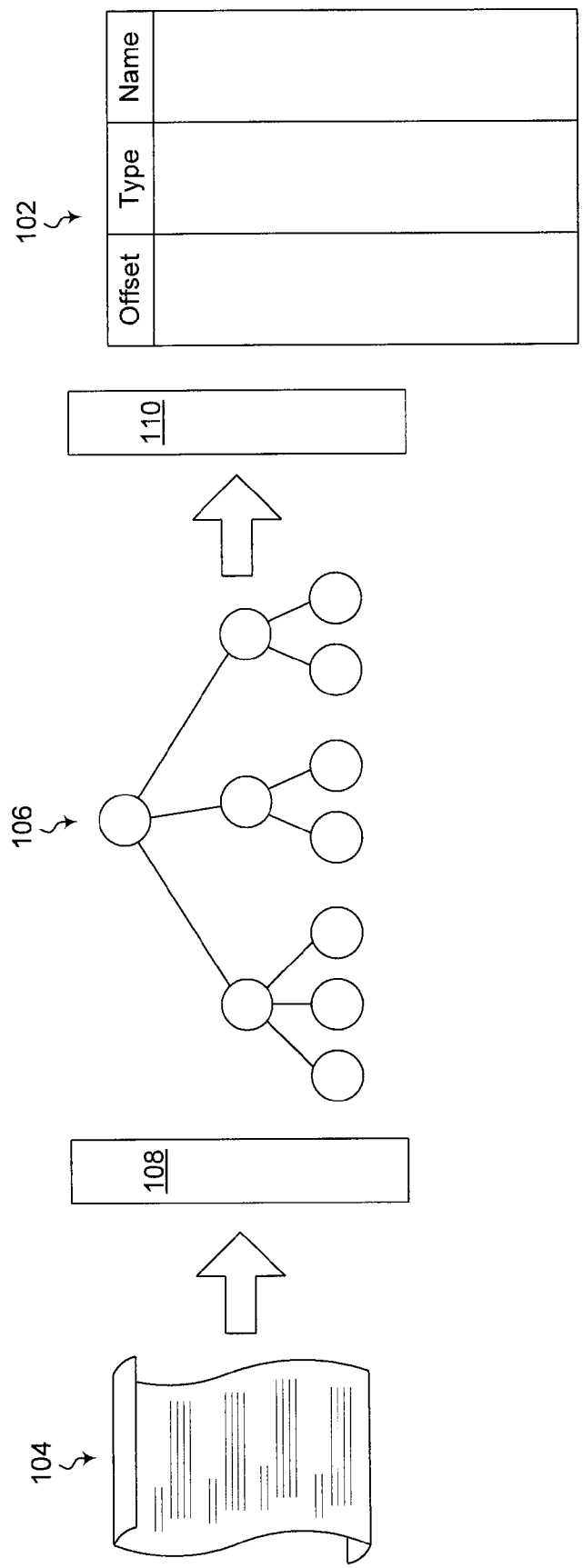
FIG. 1 illustrates transformation of a body of source code to an abstract syntax tree and use of the abstract syntax tree to create a symbol table.

Some embodiments herein facilitate dynamic code development and editing by visually presenting dynamic source code to a developer in a fashion that may be more intuitive and helps to identify scoping and other issues.

Embodiments may create a symbol table. The symbol table, as will be described in more detail below, may include details regarding symbol types, symbol origins, and symbol scopes. Using the symbol table, rich colorization visualizations can be created by parsing the source code with respect to the symbol table. Embodiments described herein implement functionality to distinguish and categorize symbol relationships (e.g., scope, type, origin, dependencies and other attributes), providing visual information that improves read-ability, assists in code refactoring and/or helps avoid a large class of programming errors based on unexpected use or alteration of symbols declared globally or at other, non-local procedure depths.

Some embodiments implement functionality related to colorizing, visually adorning or grouping variables in the editor according to symbol scope. While some current editors, for prominent languages such as C++, C#, and JavaScript, render variable names in a uniform way, some embodiments may increase the information density of rendered variable names by colorizing them according to how they are resolved symbolically. Examples are illustrated below in FIGS. 6-9 as will be discussed in more detail below.

Determining how to visually enhance a body of source code can be accomplished by parsing the body of source code with respect to the symbol table. This can be used to determine symbol types, origins, scopes, dependencies, etc as expressed in the source code based on organization and information in the symbol table. Additionally, errors can be determined. For example, if while parsing a body of source code, a symbol from the source code is not found in the symbol table, it can be determined that an error is likely in the source code. This can be visually indicated to a developer.

The following illustrates examples of how a symbol table and other related data structures may be obtained.

Some embodiments illustrated herein implement an approach to generate and maintain symbolic references from source code, without literally executing code, to support a range of features related to identifying, analyzing, refactoring, etc, variables and definitions.

As intimated above, it is hard to conclusively identify symbols backing references in dynamic languages through static parsing and/or analysis. As a result, many modern editor language services today depend on code execution to generate a list of symbols at a specific source code context/scope. This approach has clear limitations and issues. It is difficult to guarantee, for example, that a breakpoint set in a JavaScript function will be hit on calling it outside of actual program/web site execution (or that the breakpoint will be hit in a timely way). It is even less practical to consider executing code across an entire program to generate the comprehensive sort of symbol analysis that would be performed, for example, identify all code locations that reference a given symbol.

Thus, embodiments can address these issues by implementing an approach to generate and maintain symbolic references, without literally executing code. In particular, as an alternate to code execution, embodiments may combine several components which, in concert, provide significant symbol analysis outside of a runtime environment. The result is a rich set of refactoring and other valuable integrated development environment features. An integrated development environment includes an integrated application that provides development functionality such as editing, project management, source control, compilation and/or linking, publishing, post-build verifications, etc.

Referring now to FIG. 1, in some embodiments, a symbol table 102 is constructed from implied and explicit inputs (such as, among other things, source files of a body of code 104) of a dynamic language. A symbol table data structure correlates identifiers in a program's source code with augmented information relating to its declaration or appearance in the source code. The symbol table may include, for example, correlation between an identifier and information related to type, scope level, location, etc.

In some embodiments, symbols and symbol references are read from persisted data and/or discovered and/or inferred from a multi-pass traversal of an abstract syntax tree (AST) representation 106 of a body of program code 104. While ASTs are referred to in the examples below, it should be appreciated that other types of syntax trees may be used additionally or alternatively. A symbol table 102 including mapping between source code offsets and symbolic references is constructed. This mapping can be used to implement various editor features. For example, such features may include one or more of 'go to symbol definition', 'find all references to this symbol', 'rename this variable', etc.

Illustrating now additional detail, some embodiments described herein include methods and/or apparatus to construct and understand a rich set of symbols & symbolic references, by combining several different techniques into a single system. For example, as illustrated in FIG. 1, a first technique uses one or more parsers 108 to create ASTs 106 from source code 104. The one or more parsers can construct symbol tables 102 from the AST 106 input. A second technique that may be used, in some embodiments with the first technique, includes reading and/or hydrating static, literal descriptions of symbols directly. In particular, if symbols can be determined by static analysis or inferences, this technique could be used to resolve some symbols. A third technique that could be used with other techniques includes using type inferencing code that models runtime type resolution. This could be augmented by static annotations that signify type information and/or declarations for variables. A fourth technique that could be used with other techniques includes using code and/or extensibility points that model symbol table manipulation based on an understanding of runtime behaviors of both a platform itself and/or calls to specific APIs. A fifth technique that could be used with other techniques includes defining and/or enforcing coding guidelines provided to developers that help maximize discoverability of relevant information. In some embodiments, enforcing guidelines may be facilitated by using coding tools to drive enforcement of the coding guidelines.

Figure 2:
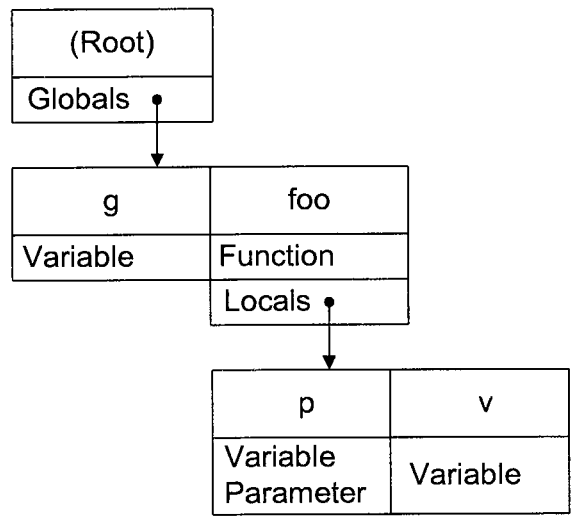
FIG. 2 illustrates an example symbol table.
Figure 3:
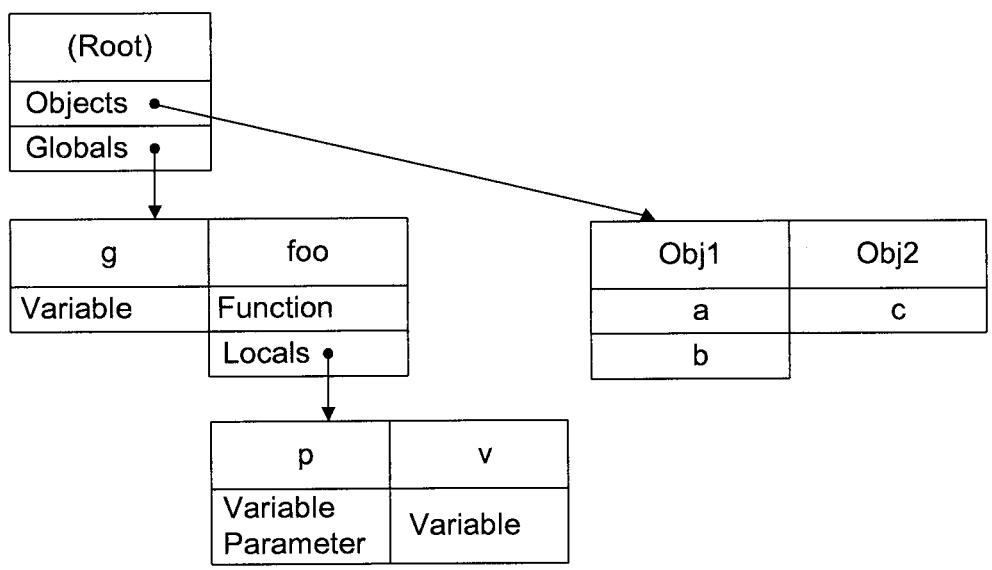
FIG. 3 illustrates another example symbol table.

FIGS. 2 & 3 illustrate example symbol tables raised from provided source code. Referring now to FIG. 2, an example symbol mapping is illustrated for the following code:

```
var g;
function foo(p) {
    var v;
}
```

The example demonstrates raising symbols from a variable declared at global scope (g), a function 'foo' also declared at global scope, a parameter 'p' (the scope of which is constrained to function 'foo') and a local variable 'v', also constrained in scope to 'foo'. The illustration shows the hierarchical relationship of these symbols. Referring now to FIG. 3, an example symbol mapping is illustrated for the following code

```
var g = {
    a: null,
    b: null
};
function foo(p) {
    var v = {
        c: null
    };
}
```

Additional details are now illustrated. It should be appreciated that while the following examples illustrate specific types, functions, etc., other embodiments may use similar or equivalent types, functions, etc. In particular, naming strategies should not be considered limiting, but rather are used for concreteness and illustration. Illustrating now further details, a first parser pass illustrating general AST 106 and hierarchical symbol table 102 construction is illustrated. In the first pass, a set of inputs is identified, either explicitly (for example, using a command-line provided by a user or a program project file maintained in an integrated development environment) or implicitly (for example, by scanning product source code 104, making assumptions about a runtime execution environment, inferring dependencies from in-source information such as links to JavaScript, XML doc comments, etc).

Figure 4:
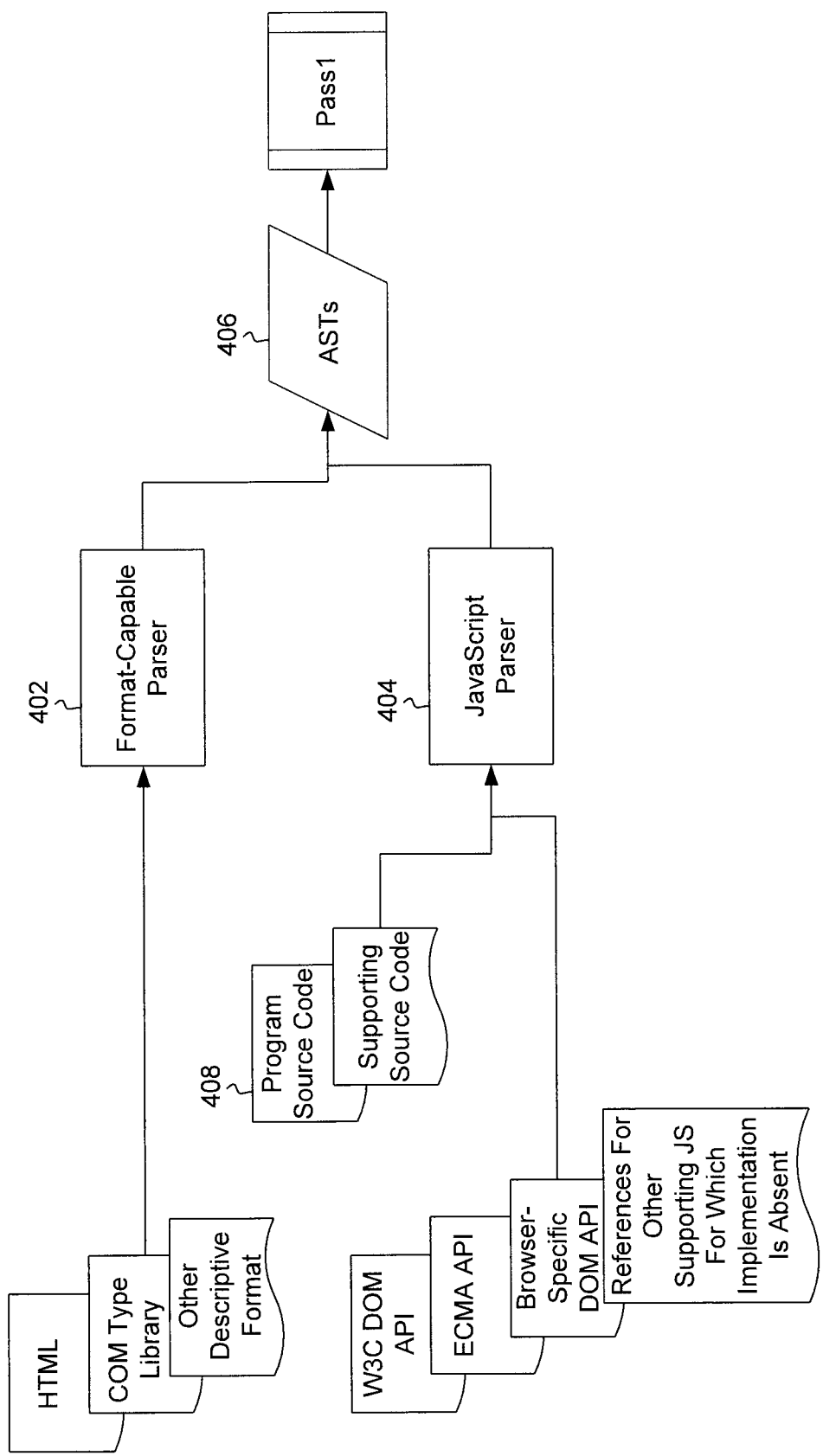
FIG. 4 illustrates parsers used for parsing code into one or more abstract syntax trees.

Referring now to FIG. 4, a specific example of tools used to analyze JavaScript applications are illustrated. While FIG. 4 illustrates a specific JavaScript example, it should be appreciated that other embodiments can use similar elements for other dynamic bodies of source code. FIG. 4 illustrates two parsers, a format-capable parser 402 and a JavaScript parser 404. The parsers can parse various bodies of computer code to produce ASTs 406, such as the AST 106 illustrated in FIG. 1.

Embodiments can include source code which falls, in some examples, into one of three categories: 1) product code, 2) other supporting 'framework' code, and 3) other supporting 'reference' code, all of which is represented by the body of source code 104 illustrated in FIG. 1. The JavaScript parser 404 is able to parse product code or program source code 408. Product code refers to the source code that comprises the user source, which is typically the target of the analysis (ie, the source code for which useful information or functionality is raised against). The JavaScript parser 404 may also parse supporting source code 410. Supporting source code 410 may include source code that facilitates execution of the program source code. For example, supporting source code 410 may include framework source code. In general, supporting source code may be code that is not part of a particular program, but that can be used to provide more information about the program. For example, supporting source code may be one or more declarations of types. Supporting 'framework' code, refers to code that also executes at runtime but which is picked up from the system, other 3rd-parties, or which simply should not be regarded as of primary interest in the current scenario. Supporting 'reference' code, refers to augmenting information which happens to be rendered in the format of the dynamic language (because this is convenient, both for tooling and for maintenance by developers). 'Reference' code is consumed by the tool only, it is not executed at runtime.

Input files may be read sequentially and abstract syntax trees 106 created for them. The ASTs 406 are subsequently traversed and a hierarchical symbol table (such as the symbol table 102 illustrated in FIG. 1) is constructed from them that expresses scoping of all discovered symbols. Symbols for functions are constructed in this phase.

A pass subsequent to the first pass may be performed to accomplish type inferencing and member population. During the subsequent pass, types are resolved as far as possible. In some embodiments, types may be resolved, for example, by inference and check. Also during the subsequent pass member symbols are populated. This subsequent pass is not performed in sequential order. The following illustrates heuristics used to determine the order in which the code is analyzed. Global code is analyzed first. Functions (both declarations and function expressions) are queued up for execution, and ceteris paribus will be analyzed in the same order they were found after all global code has been analyzed. A call to a function will cause it to be analyzed ad hoc, being removed from the queue, if present, or added to it if not. When performing the latter step, 'Miranda' prototyping rules are used, meaning that if the types of the parameters to a function are not known, they will be supplied by the known types of the arguments at the first function call point.

In the following description, much of the descriptive information is specific to JavaScript. However, it should be noted that these examples are merely illustrative and other embodiments may be used with other languages. Type inferencing is performed in a bottom-up fashion. As the parser 108 recursively walks the AST 106, it bubbles up types for sub-expressions recursively and applies rules to infer type expressions whose type is unknown. The following illustrate rules that may be applied. Literals (Boolean values, strings, numbers, null, objects, arrays) denote their own type. Identifiers that refer to functions are of type Function. Identifiers that refer to symbols whose types have been inferred are of the same type as the symbol to which they refer. Additive expressions are of type String if either operand is a String, in which case both sides are inferred to be of type String. Other additive expressions and all other arithmetic expressions (both binary and unary) are of type Number, and their operands are inferred to be of type Number. Boolean expressions (both binary and unary) are of type Boolean, and their operands are inferred to be of type Boolean. Function call expressions are of the same type as the function being called has been inferred to return. "New" expressions are of the type designated by the function used in the new expression. Return statements cause the current function to be inferred to return the type of the return expression. Control flow statements (for loops, ifs, switches, returns, etc.) are of type "void" (or "undefined" in JavaScript). For inference rules above, it is possible to use annotations (see below) to explicitly define types.

In some embodiments, functions are categorized into one of four categories, i.e.: unknown, static functions, member functions, or constructors. A function may be initially unknown and is categorized based on usage. A function called directly is considered static. A function called through on an object instance is the objects member function. A function used in a new expression is marked as a constructor. As with types, the annotations mechanism can also impact categorization of functions.

Illustrating now a particular special case, JavaScript includes a keyword 'this.' The 'this' keyword refers to the execution context of a function, which can differ for each function call. The resolution of 'this' in JavaScript is dependent on runtime information complicating performance of a complete static analysis. Embodiments may use a number of now illustrated heuristics to determine to what a reference to 'this' refers. If the context is global code or if the function is static or unknown, then 'this' evaluates to a symbol that represents the global scope (e.g., the "window" object in browsers). If the context is a constructor, then 'this' evaluates to a prototype object of the function it represents. If the context is a function being assigned to an object member, then 'this' evaluates to the object. If the context is a member function, then 'this' evaluates to the prototype of the function that declares the type of the member on which this function is being called. It is possible to use language augmentations (annotations) to describe the binding of the function and override the above heuristic rules.

For property accessors, the type of the left-hand side expression is evaluated and the right-hand side identifier is sought in the symbol table, following the relevant type's prototype chain.

Some embodiments may implement or support direct symbol hydration and symbol hydration with alternate parsers.

Embodiments may provide a mechanism for directly populating the symbol table 102 based on parsing inputs other than literal source code that will execute at runtime. In one illustrative example, the JavaScript parser 404 may further include functionality for parsing application programming interface (API) code. For example, FIG. 4 illustrates the JavaScript parser 404 parsing API code for W3C APIs, ECMA APIs, and browser-specific Document Object Model (DOM) APIs. W3C DOM API, ECMA(X) API (such as Math functions), JavaScript API, COM objects, browser-specific API, browser specific DOM extensions, etc, can be expressed as (generally bodiless) JavaScript functions/variables that are passed to the AST analyzer described above. The JavaScript parser 404 may further include functionality for parsing reference code for other supporting JavaScript for which implementation is absent. This may be functionality (functions, types, etc.) that are assumed to be available during runtime, but are not part of the program. Reference code refers to metadata sufficient to model symbolic references which cannot be computed and/or inferred from production code. This may include the body of executable API that is provided as built-in browser/ECMA script functionality (such as the HTMLElement class and JS Math functions). This may include 'foreign' api that model code which is callable due to some interop mechanism (such as calling into a COM object or a web service). Reference code may include 'type definitions' which are superimposed onto production code but which are otherwise irrelevant at runtime. In a reference file, for example, embodiments may include a description for a type that includes only two methods, foo and bar. In a product file, a parameter may be annotated as being of this type. At analysis time, embodiments can ensure that only methods named foo or bar are called on that parameter.

The format-capable parser 402 is configured to parse HTML, COM type libraries, and other descriptive formats as now described in more detail. APIs that are 'foreign' to the language/runtime (i.e., for which some sort of special interop code is required to execute at runtime, e.g., COM objects) can be added to the symbol table by parsing relevant descriptive formats (such as type libraries) and/or these descriptions can be converted to a format (such as in the particular illustrated example, JavaScript) which can be fed directly to the symbol table construction code. The system can accept static (such as user-authorable) descriptions of symbols as well as extensions that parse arbitrary data formats and populate the symbol table accordingly. An example of the latter is an extension that parses HTML to populate the symbol table with DOM elements expressed in mark-up that are accessible to JavaScript code (such as calls to getElementsById). There is some tolerance in the system for errors and/or incompleteness of reference data as distinct from production code (which will be modified and/or analyzed within the editor).

Some embodiments may implement or facilitate extensions that model runtime symbol construction. Embodiments may provide a mechanism for populating the symbol table not merely with code as it is analyzed but, in some cases, based on the result at runtime when executing that code. Some useful examples relate to JavaScript utility code that constructs and populates object instances with members. Ecma5 JavaScript provides helpers such as object.createProperty which can, in some cases, be modeled by the system. String literals passed to eval can be parsed into AST and injected into the AST and/or symbol table.

Some embodiments may benefit from constraining development practices to maximize code discoverability. There are typically a set of coding guidelines/practices that have a high return as far as helping with the ability of embodiments to function with a correspondingly low impact on the expressiveness and/or utility of the dynamic language. One example of such a constraint is directing developers to avoid use of eval statements in JavaScript. In some embodiments, these constraints may be enforced by coding tools which prevent developers from violating constraints, or at least warn a developer if they are about to break or exceed a constraint.

Embodiments may include a mechanism for reporting conditions to users that limit the ability to analyze source. In particular, there may arise situations in which dynamic source code cannot be completely analyzed and/or all symbols resolved. Embodiments can include functionality to indicate such to developers when such conditions arise.

Using the symbol table, embodiments may implement a number of other functionalities. For example, embodiments may implement various editor features such as one or more of 'go to symbol definition', 'find all references to this symbol', 'rename this variable and all references to it', etc.

Embodiments may include functionality to create or use an ability to display a representation of implicitly available API, for informational purposes and to potentially serve as both the target for 'go to reference' or the source for 'find all references to this symbol' features.

Embodiments may include functionality to create or use a mechanism for modeling symbol construction based on analyzed code. Embodiments may include call sites to an API that constructs a class object based on a set of input parameters. For example, input parameters could be transformed into symbols that represent actual objects as they will be available at runtime, based on analyzed code.

Embodiments may include functionality to create or use a mechanism for specifying, authoring/edited descriptive inputs representing symbol tables entries, in formats such as XML, native JavaScript, etc. This may also include the ability to parse HTML to identify runtime-available objects. For example embodiments may be able to identify elements marked with a specific identifier (such as an HTML 'id' attribute).

Embodiments may include functionality to create or use an ability to annotate source code with 'type' information. This may allow embodiments to jump to a type or object definition that might exist as actual project source or is solely represented in generated code and/or static descriptive input files.

Embodiments may include functionality to create or use an ability to annotate source code files with (or otherwise associate) a set of dependencies (such as another supporting JavaScript file) used to construct a comprehensive symbol space for analysis.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
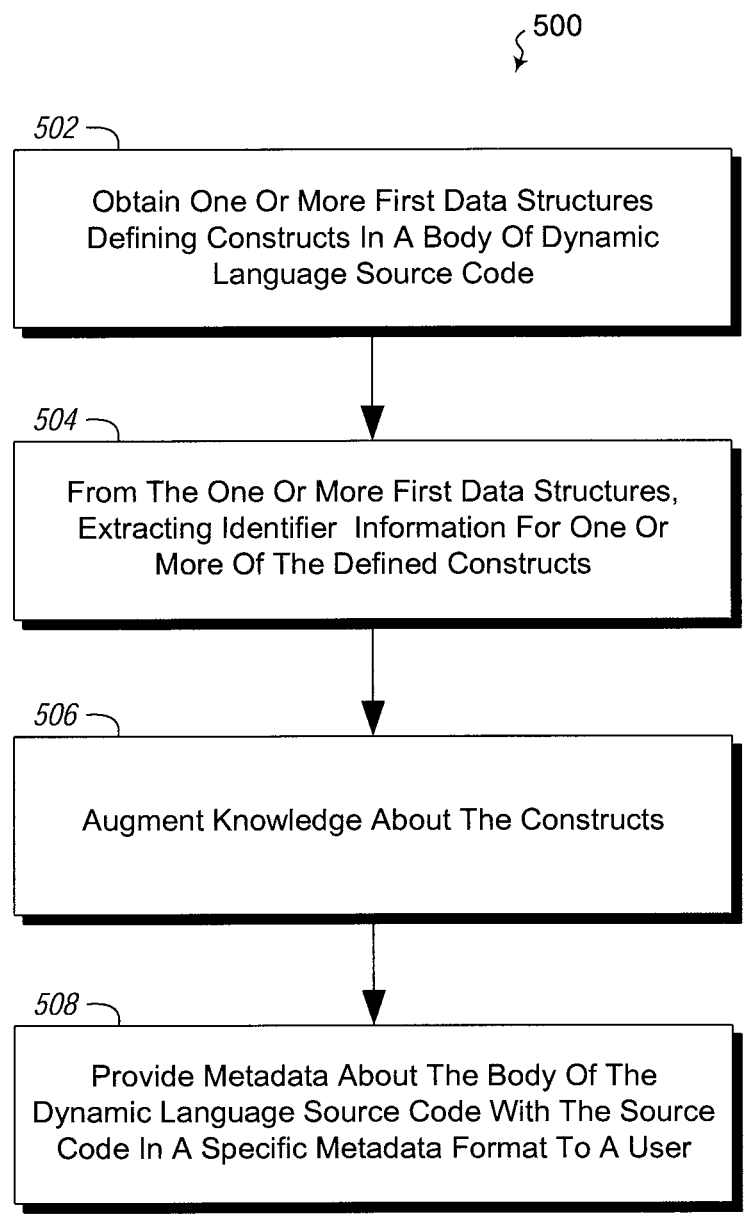
FIG. 5 illustrates a method of creating metadata for dynamic code.

Referring now to FIG. 5, a method 500 is illustrated. The method 500 may be practiced in a computing environment. The method 500 includes acts for creating metadata for dynamic code in a descriptive metadata language. The method includes obtaining one or more first data structures defining constructs in a body of dynamic language source code (act 502). For example, in some embodiments, the one or more first data structures comprise at least one of a syntax tree or an abstract syntax tree. FIG. 1 illustrates a abstract syntax tree 106 derived, at least in part from a body of source code 104. In the example illustrated in FIG. 1, the abstract syntax tree 106 is the specific example of a data structure.

The method 500 further includes, from the one or more first data structures, extracting identifier information for one or more of the defined constructs (act 504). For example, embodiments may extract symbol names into a symbol table.

The method 500 further includes augmenting knowledge about the constructs (act 506). Augmenting knowledge about the constructs can be accomplished in a number of different ways. For example, augmenting may be based on explicit inspection of the body of dynamic language source code. For example, the dynamic language source code may include comments in the code that can be used to augment knowledge about constructs in the code. Explicit inspection of the body of dynamic language source code may include inspection of code that is a surrogate for an actual implementation or which models code that is not explicitly expressed in source code form. For example, this may include cases of dropping in reference files to replace 3rd party frameworks in an analysis tool chain as well as modeling things like built-in DOM API (which have no actual representation as JavaScript source code.

Alternatively or additionally, augmenting may be based on one or more implied inferences. For example, if it can be determined that source code concatenates to a string literal using an object as an operand, it can be determined that the resulting object is a string. If an arithmetic operation is performed using an object as an operand, it can be determined that the object is a numerical type, such as an integer or floating point. Inferences may be may be made based on a framework supporting source code. For example, knowledge about a framework and knowing how that framework will consume source code can facilitate inferring addition information about the source code. Similarly, context can be used to infer additional information. For example, context such as a browser which source code will be used with and knowing how that browser will interact with source code can facilitate inferring addition information about the source code. Further still, stand in code can be used to make inferences to augment knowledge about source code. Stand-in code provides an alternate body (that is, implementation) of a function that is expressly designed to assist in computing symbolic information for variables that are within scope (as opposed to being intended to execute at runtime). This is an alternate approach to analyzing the actual implementation of a function to acquire information or depending strictly on annotations.

Embodiments could be implemented that include augmentation as a result of folding in runtime collected data. In particular, embodiments may instrument the runtime to provide information about how the type of set of types that a parameter resolved to at a specific code location. This new information may be folded into the augmented information.

Embodiments could be implemented that include augmentation as a result of modeling the results of executing code. For example, embodiments of the method 500 may be performed where augmenting includes modeling the effects upon a symbol table that would result from executing a call to one or more functions based on explicit, inferred or computed call site details. For example, assume that an embodiment has knowledge of a function constructNamespace(namespaceName), which creates a global object of the name that is passed in as an argument. During analysis, when embodiments observe a call site constructNamespace("My.Namespace"), the tool could add the specified namespace object to the symbol table so that it is subsequently available when processing the remainder of the function. Other embodiments may implement a more complicated path analysis to calculate a number of possible paths through the function, with implied arguments provided to a callee. For example, embodiments may implement symbolic execution, abstraction interpretation, control and data flow analysis, etc.

Alternatively or additionally, augmenting may be based on user input. For example a user interface using a command line tool and/or graphical based tool may be used to augment the body of dynamic language source code. For example, a user can provide additional information about objects in code, similar to how commenting might work, but without needing to formally comment the source code. Rather, the tool may be used to allow a user to make external comments about source code.

The method 500 further includes providing metadata about the body of the dynamic language source code with the source code in a specific metadata format to a user (act 508). For example, and as illustrated previously, the specific metadata format may include a symbol table.

The following now illustrates how various visualizations may be implemented based on information in the symbol table. Some embodiments may implement functionality related to colorization and/or editor squigglies. An example of this is illustrated below in FIG. 6 at 604. This may be implemented for symbol declaration and/or use that represents or contributes to possible code correctness and maintainability issues. For example, this may facilitate detecting instances of declaring a local variable in source code with the same name as an instance member. Colorization and/or editor squigglies implementations may potentially include altering colorization of variables based on runtime aspects of the symbol. For example, such runtime aspects may include a semantic analysis that identifies use of uninitialized, disposed, and/or otherwise invalid variables. The aspects can then be highlighted by colorization adornments and/or editor squigglies.

Some embodiments may highlight all references to a symbol. In some embodiments, a symbol definition in a body of source code may be highlighted by a user using a user interface clicking an individual reference to the symbol. This feature may be particularly useful for JavaScript, other dynamic languages. Some embodiments may include a feature that could select and/or highlight all variables required to generate a closure of a selection.

Embodiments may include functionality for colorizing, visually adorning and/or grouping variables and other symbol definitions by accessibility. An example of this is illustrated at 602 in FIG. 6 and discussed in more detail below. For example, embodiments may include functionality for distinguishing between variables, functions, etc, that are available only within a class definition (i.e. private), available within that class and sub-types (i.e. protected), etc., and/or distinguishing between writable and constant and/or non-writable values.

Embodiments may include functionality for visualizations that represent the origin and optionally the resolution logic for a symbol. For example, a visualization associated with a non-fully qualified C# type name could display its source assembly and fully qualified namespace, as well as other symbols (such as identically named types in other assemblies or other types of identical short name in other namespaces). The other symbols could be alternate candidates for resolution, such as for example by qualifying the short type name with a different namespace.

Embodiments may include functionality for visualizations for symbol type information at a particular point in code based on static inputs, type inferencing via static analysis, etc. A JavaScript parameter, for example, could be visually identified as conclusively or possibly a String type at a specific point in code (via info tip, colorization, etc). Embodiments may colorize or otherwise visually enhance variables by type, String, Number, Object, Regexp, Function, a user-defined type, etc, when known and/or colorize or otherwise visually enhance the type/constructors names themselves.

Embodiments may include functionality for analyzing JavaScript that is inlined in HTML and/or has DOM dependencies. JavaScript code can access symbols that represent HTML elements (referenced by id), CSS styles, etc., the resolution of which is not clear in the editor. The symbols could then be visually enhanced using the functionality illustrated herein.

Embodiments may include the ability to provide visual enhancement to help a developer distinguish between symbols defined in user source as opposed to supporting code. As described above, supporting source code may include, for example, implied browser/W3C DOM and ecma JavaScript API, helper 'libraries' such as jquery, etc.

Embodiments may include functionality to provide visual enhancements to help a developer to identify and/or distinguish symbols that are associated with a specific source. For example embodiments can provide visual enhancements to identify a source as one or more of an implied browser DOM, a supporting JavaScript file, or, in the managed world, a specific assembly, namespace or sub-namespace.

Embodiments may include the ability to support variable expansion and/or interpolation. For example, embodiments may include functionality for resolving a construct such as window.eval("var foo=7,") or, in C#, resolving a call to Activator.CreateInstance(string, string) with explicit or inferred argument values to the corresponding type symbol.

Embodiments may include functionality to provide visual enhancements to show variable declarations that override a symbol in a local or parent scope. For example, embodiments may provide squigglies, with right-click pop-up details regarding overridden symbols. Some embodiments may include the ability to navigate to symbol using gestures or other input.

Var declarations that do not explicitly use the 'liar' keyword often indicate a typo/correctness problem. By visually enhancing all global data in a uniform way, embodiments can raise visibility on this class of issue.

Local variables which are defined without the 'liar' keyword are visible to other functions. Embodiments may include functionality to implement visual enhancements such as colorization and/or the ability to view an aggregated list of all variables available in local scope. In some embodiments, this may be done for variables defined only in project and not supporting code.

In some languages, the scope of local variables is constrained from being restricted within a function body. Thus, embodiments may include functionality to provide visual enhancements to have an expandable view at the top of a function that shows all locally defined variables. In some embodiments, a user interface may be provided for refactoring code which allows a user to extract and define all local variables at the beginning of the function.

The resolution of 'this' within JavaScript code is often ambiguous. Thus, embodiments can provide visualizations to resolve ambiguities. As an example, hovering over 'this' might result in a tooltip that displays the type name of the instance referred to. In another example, the user might be able to right-click on 'this' and jump to the constructor/class definition of the related type.

JavaScript symbol state (e.g. undefined vs. null) and type coercion rules are particularly complicated. Embodiments can provide visualizations to clarify symbol state and/or type coercion. A 'definite assignment' analysis performed against code may allow embodiments to determine that a specific variable might be undefined. Another code path might indicate an assignment of a string. In a follow-on code path, embodiments might encounter the use of JavaScript constructs such as instanceof, typeof or equality to true or false. At these code points, embodiments may display to the user what possible type and/or symbol states are believed to be included. This may allow embodiments to determine, for example, that a comparison in a conditional statement might never evaluate to true (or false). Alternatively or additionally, embodiments may issue a warning that a typeof comparison will never evaluate to true (or false).

Embodiments may include functionality to implement visual enhancements to distinguish between functions which are constructors and those which are not constructors. For example, functions which are constructors could be colorized in one way while functions which are not could be colorized in a different way. Some embodiments may have a default of no coloring, but colorizing for either functions which are constructors or those which are not constructors, but not both.

Some embodiments may implement visual enhancements that can be applied in dynamic languages. The following illustrates examples that may be used in static languages such as C#.

Some embodiments may include functionality to visually differentiate between access of parameters, locals, instance and static members.

Some embodiments may include functionality to colorize and/or automatically group members by one or more of member kind (e.g. event, field, etc), mutability (e.g. const, readonly, etc), or accessibility (e.g. private, protected, etc)

Some embodiments may include functionality to colorize use of nested types within an implementation.

Some embodiments may include functionality to distinguish member access by member kind. For example, embodiments may include functionality to distinguish between accessing a field with a capitalized name versus accessing a property.

Some embodiments may include functionality to identify method definitions that unexpectedly replace those in a base type. Some embodiments may accomplish this by colorizing a weakly typed override that masks a strongly typed base definition. Some embodiments may include colorizing code that satisfies a code contract required by a base type (for example, an abstract member declared in a base type) or an interface. A developer may be interested in knowing, for example, the specific set of members declared on a type that were authored to provide a complete implementation of an interface.

Some embodiments may include functionality to inline or otherwise provide ability to view inherited members in a class definition.

Some embodiments may include functionality to expand method declarations to show chain of overrides leading to the definition.

Some embodiments may include functionality to colorize extension methods which are typically of visually non-obvious origin.

Generally, embodiments may include mechanisms for customizing visualizations. For example, user interface elements may be provided that allow a developer to enable or disable visualizations. Embodiments may include functionality to allow a user to switch between visualizations. Embodiments may include functionality to allow a user to use user gestures to dismiss and/or disable specific visualizations and/or results. Some embodiments may implement user extensibility points to allow a user to customize the appearance of various visualizations. For example, a user may be able to select a color scheme, the use of highlighting versus the use of squigglies, etc.

Referring now to FIG. 6, several visualizations by scope relationship in a JavaScript editor are illustrated. Note, in the examples illustrated in FIGS. 6-9, text rendered in a blue font is shown in the drawings with a single underline, text rendered in a red font is shown in the drawings with a double underline, and text rendered in a green font is shown in the drawings with a triple underline. At 602 a global variable named 'myGlobal' is declared and each reference is colorized to indicate the reference originates in global scope. At 604, parameter 'name' is determined to have overwritten a symbol in global scope (window.name). The error is marked by a squiggly and a pop-up provides the user details of the issue. At 606, the identifiers for all variables within the most nested local scope are colorized as black in this code example. At 608, a variable 'index' is used without being explicitly declared. It is therefore of global scope and colorized in red. Additionally, the editor puts a squiggly under the identifier to call attention to the fact that there is an implicit declaration here that results in a modification to the global scope. At 610 the alert function is called with three different variables declared in varying scope, the most nested function, a parent function, and the global namespace.

Figure 7:
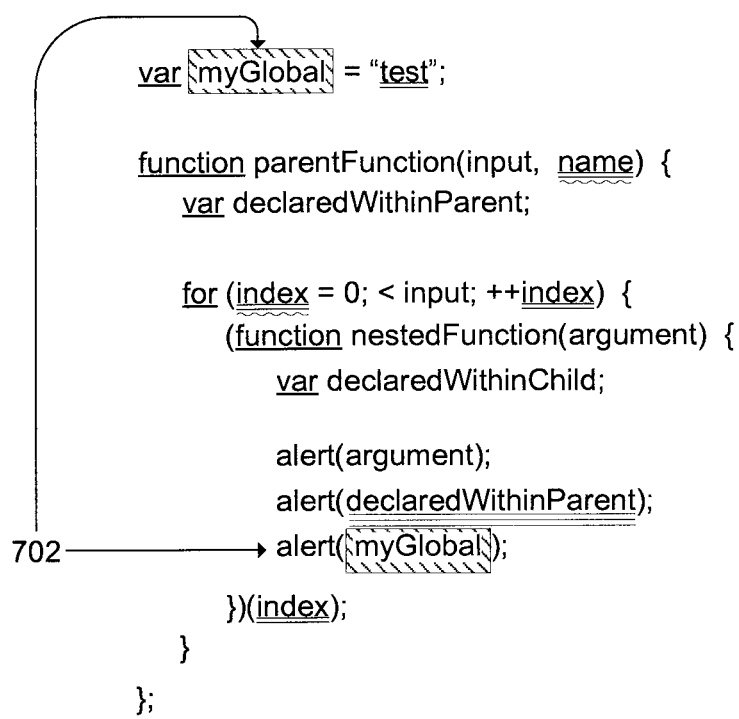
FIG. 7 illustrates a number of editor visualization implemented by some embodiments.

Referring now to FIG. 7, another visualization example is illustrated. In the example illustrated in FIG. 7, the user has clicked on or hovered over a reference to 'myGlobal' and all visible references to that symbol are highlighted in the editor.

Figures 8, 9:
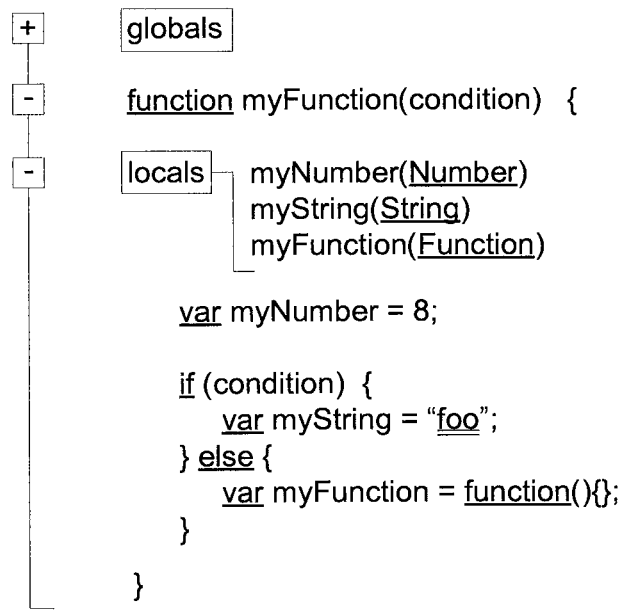
FIG. 8 illustrates a number of editor visualization implemented by some embodiments.
FIG. 9 illustrates a number of editor visualization implemented by some embodiments.

Referring now to FIG. 8, another visualization example is illustrated. In the example illustrated in FIG. 8, the user is click-dragging over a chunk of code. When the user pauses (with the mouse button still depressed), the editor draws boxes around all visible references that would be required to generate a closure of the selection.

Referring now to FIG. 9, another visualization example is illustrated. In the example illustrated in FIG. 9, the editor has aggregated all available global symbols, and locals for visible function definitions. The user has expanded the locals visualization for 'myFunction' and can view all variables of that scope. In the present example, this includes all variables defined within the function, as JavaScript does not constrain symbol scope to the declaring block within a routine. The locals visualization could also have usefully included/noted the parameters in the function declaration as well.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 10:
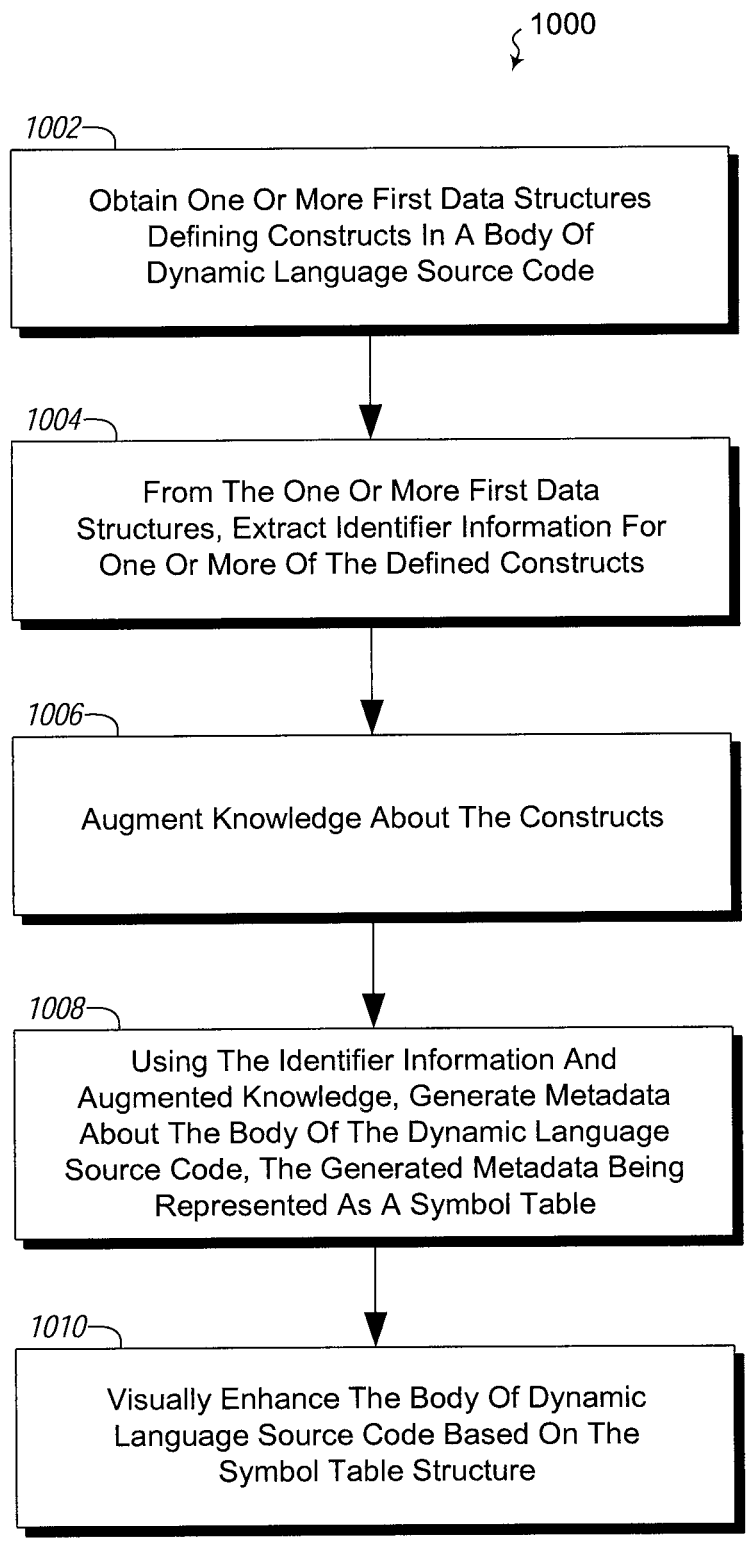
FIG. 10 illustrates a method of enhancing dynamic source code.

Referring now to FIG. 10, a method 1000 is illustrated. The method 1000 may be practiced in a computing environment and includes acts for transforming dynamic code. The method 1000 includes obtaining one or more first data structures defining constructs in a body of dynamic language source code (act 1002). From the one or more first data structures, the method 1000 further includes extracting identifier information for one or more of the defined constructs (act 1004). The method 1000 further includes augmenting knowledge about the constructs (act 1006). The method 1000 further includes using the identifier information and augmented knowledge, generating metadata about the body of the dynamic language source code, the generated metadata being represented as a symbol table (act 1008). The method 1000 further includes visually enhancing the body of dynamic language source code based on the symbol table structure (act 1010).

Embodiments of the method 1000 may be practiced where visually enhancing the body of dynamic language source code comprises indicating symbol types by visual artifacts.

Embodiments of the method 1000 may be practiced where visually enhancing the body of dynamic language source code comprises indicating symbol resolution by visual artifacts. This may address issue of determining how and/or whether a symbol satisfies a required contract and/or abstract definition, overrides or masks a previously existing symbol or base type definition, etc.

Embodiments of the method 1000 may be practiced where the body of dynamic language source code comprises indicating at least one of symbol origin, symbol scope, indicating symbol, at least one of uninitialized, disposed or invalid variable, symbol availability by visual artifacts. Visually enhancing the body of dynamic language source code may include displaying visual artifacts. The visual artifacts may be embodied in various different forms, such as using, uniform colorization, tooltips, shading, outlining, squigglies, etc.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of enhancing dynamic code, the method comprising:
    obtaining one or more first data structures defining constructs in a body of dynamic language source code;
    from the one or more first data structures, extracting identifier information for one or more of the defined constructs;
    augmenting knowledge about the constructs, wherein augmenting comprises modeling the results of executing code including symbolic execution, abstraction interpretation, and control and data flow analysis;
    generating metadata about the body of the dynamic language source code by using at least the identifier information extracted from the one or more first data structures and the augmented knowledge, the generated metadata being represented as an abstract symbol table (AST);
    traversing the AST and constructing a hierarchical symbol table that expresses scoping of all discovered symbols;
    performing a subsequent traversal of the AST to accomplish type inferencing and member population;
    visually enhancing the body of dynamic language source code based on the hierarchical symbol table structure; and
    wherein visually enhancing the body of dynamic language source code comprises indicating symbol scope by visual artifacts.

2. The method of claim 1, wherein visually enhancing the body of dynamic language source code comprises indicating symbol types by visual artifacts.

3. The method of claim 1, wherein visually enhancing the body of dynamic language source code comprises indicating symbol origin by visual artifacts.

4. The method of claim 1, wherein visually enhancing the body of dynamic language source code comprises indicating symbol dependencies by visual artifacts.

5. The method of claim 1, wherein visually enhancing the body of dynamic language source code comprises indicating at least one of uninitialized, disposed or invalid variable by visual artifacts.

6. The method of claim 1, wherein visually enhancing the body of dynamic language source code comprises indicating symbol availability by visual artifacts.

7. The method of claim 1, wherein visually enhancing the body of dynamic language source code comprises displaying visual artifacts.

8. The method of claim 7, wherein the visual artifacts comprise uniform colorization.

9. The method of claim 7, wherein the visual artifacts comprise tooltips.

10. The method of claim 7, wherein the visual artifacts comprise squigglies.

11. The method of claim 1, wherein visually enhancing the body of dynamic language source code comprises indicating symbol resolution by visual artifacts.

12. One or more computer readable hardware storage devices comprising computer executable instructions that when executed by one or more processors cause one or more processors to perform the following:
    obtaining one or more first data structures defining constructs in a body of dynamic language source code;
    from the one or more first data structures, extracting identifier information for one or more of the defined constructs;
    augmenting knowledge about the constructs, wherein augmenting comprises modeling the results of executing code including symbolic execution, abstraction interpretation, and control and data flow analysis;
    generating metadata about the body of the dynamic language source code by using at least the identifier information extracted from the one or more first data structures and the augmented knowledge, the generated metadata being represented as an abstract symbol table (AST);
    traversing the AST and constructing a hierarchical symbol table that expresses scoping of all discovered symbols;
    performing a subsequent traversal of the AST to accomplish type inferencing and member population;
    visually enhancing the body of dynamic language source code based on the hierarchical symbol table structure; and
    wherein visually enhancing the body of dynamic language source code comprises indicating symbol scope by visual artifacts.

13. The one or more computer readable storage devices of claim 12, wherein visually enhancing the body of dynamic language source code comprises indicating symbol types by visual artifacts.

14. The one or more computer readable storage devices of claim 12, wherein visually enhancing the body of dynamic language source code comprises indicating symbol origin by visual artifacts.

15. The one or more computer readable storage devices of claim 12, wherein visually enhancing the body of dynamic language source code comprises indicating symbol dependencies by visual artifacts.

16. The one or more computer readable storage devices of claim 12, wherein visually enhancing the body of dynamic language source code comprises indicating at least one of uninitialized, disposed or invalid variable by visual artifacts.

17. The one or more computer readable storage devices of claim 12, wherein visually enhancing the body of dynamic language source code comprises indicating symbol availability by visual artifacts.

18. In a computing environment, a system enhancing dynamic code, the system comprising:

one or more processors;

one or more computer readable media coupled to the one or more processors, wherein the one or more computer readable media comprise computer executable instruction that when executed by one or more of the one or more processors cause one or more of the one or more processors to perform the following:

parsing source code to generate one or more syntax trees defining constructs in a body of dynamic language source code;

from the one or more syntax trees, extracting identifier information for one or more of the defined constructs;

augmenting knowledge about the constructs by at least one of explicit inspection of the body of source code or implied inferences related to the source code, wherein augmenting comprises modeling the results of executing code including symbolic execution, abstraction interpretation, and control and data flow analysis;

producing a correlation between identifiers and augmented knowledge;

generating metadata about the body of the dynamic language source code by using at least the identifier information extracted from the one or more syntax trees and the augmented knowledge, the generated metadata being represented as an abstract symbol table (AST);

traversing the AST and constructing a hierarchical symbol table that expresses scoping of all discovered symbols;

performing a subsequent traversal of the AST to accomplish type inferencing and member population;

visually enhancing the body of dynamic language source code based on the hierarchical symbol table structure; and wherein visually enhancing the body of dynamic language source code comprises indicating symbol scope by visual artifacts.

\* \* \* \* \*